US012018454B2

(12) United States Patent
Case et al.

(10) Patent No.: US 12,018,454 B2
(45) Date of Patent: Jun. 25, 2024

(54) IMPLEMENT CONTROL CONSOLE FOR WORK MACHINES

(71) Applicant: Caterpillar Inc., Peoria, IL (US)

(72) Inventors: Michael D. Case, Elmwood, IL (US); Mihai Lazaroiu, Peoria, IL (US); Rafael R. Dela Rosa, Apex, NC (US); Brad Robert Van De Veer, Washington, IL (US); Keegan Roach, Downers Grove, IL (US)

(73) Assignee: Caterpillar Inc., Peoria, IL (US)

( * ) Notice: Subject to any disclaimer, the term of this patent is extended or adjusted under 35 U.S.C. 154(b) by 686 days.

(21) Appl. No.: 17/150,532

(22) Filed: Jan. 15, 2021

(65) Prior Publication Data

US 2022/0228345 A1 Jul. 21, 2022

(51) Int. Cl.
| E02F 9/20 | (2006.01) |
| B62D 65/02 | (2006.01) |
| E02F 3/28 | (2006.01) |
| E02F 9/16 | (2006.01) |
| E02F 9/22 | (2006.01) |

(52) U.S. Cl.
CPC ............ *E02F 9/2004* (2013.01); *B62D 65/02* (2013.01); *E02F 3/283* (2013.01); *E02F 9/16* (2013.01); *E02F 9/22* (2013.01)

(58) Field of Classification Search
None
See application file for complete search history.

(56) References Cited

U.S. PATENT DOCUMENTS

| 5,938,282 | A | * | 8/1999 | Epple | B60N 2/797 |
| | | | | | 180/315 |
| 6,039,141 | A | * | 3/2000 | Denny | B60N 2/797 |
| | | | | | 296/190.01 |
| 6,644,141 | B2 | | 11/2003 | Oikarinen | |
| 7,641,019 | B2 | * | 1/2010 | Pline | B60K 26/02 |
| | | | | | 180/315 |
| 8,483,914 | B2 | | 7/2013 | Copeland et al. | |
| 2020/0180713 | A1 | | 6/2020 | Kosaki et al. | |
| 2020/0190774 | A1 | | 6/2020 | Nishigori et al. | |

FOREIGN PATENT DOCUMENTS

DE 102006018537 B4 11/2013

* cited by examiner

*Primary Examiner* — Vicky A Johnson

(57) ABSTRACT

A work machine, an implement control console, a plurality of unique implement control pods, and a method of installing an implement control pod onto a work machine are disclosed. The work machine comprises a power unit, a locomotive device, an implement arm, a work tool, and an implement control console for controlling one or more functions of the work machine's components. The implement control console comprises a universal mounting bracket and an implement control pod, where the plurality of unique implement control pods may be installed, one at a time, to the universal mounting bracket. Advantageously, the plurality of unique implement control pods share a number of components, while the design of each implement control pod allows for concurrent one-handed operation.

12 Claims, 8 Drawing Sheets

IMPLEMENT CONTROL CONSOLE FOR WORK MACHINES

TECHNICAL FIELD

The present disclosure generally relates to control consoles and, more specifically, relates to implement control consoles for work machines.

BACKGROUND

A control console is a communication apparatus allowing a human operator to interact with and maneuver a system, machine, or device. In the context of work machines, which may include wheel loaders, compactors, excavators, skid steers, and the like, the control console may provide inputs and/or outputs for the operation of one or more hydraulically actuated implements. For example, a control console for a wheel loader may include a primary control input in the form of a joystick. An operator may move the joystick along a first axis to actuate a lifting action of a boom or move the joystick along a second axis to actuate a tilting action of a bucket via their corresponding hydraulic cylinders. In addition, a plurality of secondary control inputs, such as keypads, switches, buttons, and the like, may supplement the joystick in controlling the same implement or other implements of the work machine. The control console may also direct other features of the work machine, ranging from driving and engine related functions to cabin controls, such as climate and seat adjustments.

Existing implement control consoles for work machines, while effective, may be improved in terms of operator ergonomics and supply chain considerations. First, the prior art does not provide a control console enabling ergonomic one-handed operation. More specifically, the shape, orientation, and input placement of these control consoles prevent many operators from comfortably accessing both the primary control input (e.g. the joystick) and the secondary control inputs (e.g. the switches) simultaneously with the use of only one hand. However, one-handed operation is frequently a requirement for many work machines tasks, while the ability to multi-task controls can improve the agility of an operator and, subsequently, the efficiency of the machine. In the case of a wheel loader, for example, an operator typically keeps his left hand on a steering wheel while using his right hand to manipulate the implement control console. The implement control console may include a primary control input directed towards the wheel loader's bucket and a secondary control input directed towards a transmission shift. Thus, it is easy to imagine a scenario where the operator benefits from simultaneously actuating the bucket while reversing a direction of the work machine. However, in such cases, the state of the art would fail to enable multi-tasking that is adequately ergonomic or fail to enable multi-tasking altogether.

Second, the control consoles taught by the prior art are not as modular as desired, where a lack of compatible parts between control consoles may negatively affect the supply chain. For example, it is commonly seen that, among ten possible configurations of a particular series of work machine, each configuration may employ a unique control console, including a unique mounting bracket, housing, input arrangement, etc. However, the lack of shared components may compel manufacturers to produce individual parts at smaller quantities, force vendors to store larger inventories, and increase the cost for customers overall. With regard to ease of use, an assortment of different control consoles may force the operator to learn multiple and potentially contradicting layouts, leading to confusion and user error. Finally, a lack of modularity between control consoles may constrain the quantity of prebuilt components and prevent last-minute customization, thus increasing customer lead times.

One example of prior art is found in US Publication No. 2020/0180713 by Kosaki et al., which discloses a work vehicle, an operator seat, and a control console situated on an arm rest of the operator seat, the control console including an operation lever (i.e. a primary control input) and a plurality of operation tools (i.e. secondary control inputs). However, in line with the prior art, the disclosure of Kosaki fails to arrange the plurality of operation tools within one-handed range of the operation lever, thereby forcing an operator to engage only one or the other at a time. Furthermore, Kosaki, whose control console corresponds to a specific work vehicle only, discloses no modularity of control consoles between different work vehicles and no common components between different control consoles.

Accordingly, a modular implement control console with improved comfort, accuracy, and ease of use for the operator, specifically during a one-handed operation, is designed.

SUMMARY OF THE DISCLOSURE

According to a first aspect of the present disclosure, an implement control console is disclosed. The implement control console comprises a universal mounting bracket and an implement control pod installed on the universal mounting bracket, the implement control pod including a primary control input and at least one secondary control input. Each secondary control input is capable of concurrent one-handed operation with the primary control input.

According to a second aspect of the present disclosure, a work machine is disclosed. The work machine comprises a work machine body, a power unit supported by the work machine body, a locomotive device supporting the work machine body and being operatively driven by the power unit, an implement arm attached to the work machine body at a proximate end and attached to a work tool at a distal end, a hydraulic power system, an operator cabin supported by the work machine body, and an implement control console housed inside the operator cabin. The control console includes a universal mounting bracket and an implement control pod installed on the universal mounting bracket, the implement control pod including a primary control input and at least one secondary control input. Each secondary control input is capable of concurrent one-handed operation with the primary control input.

According to a third aspect of the present disclosure, a method of installing an implement control pod onto a work machine is disclosed. The method comprises providing an operator seat having a universal mounting bracket, attaching a primary control input to the universal mounting bracket, wiring the primary control input to the work machine, attaching a top cover supporting at least one secondary control input to the universal mounting bracket, wiring the at least one secondary control input to the work machine, and attaching a universal bottom cover to the universal mounting bracket.

These and other aspects and features of the present disclosure will be more readily understood after reading the following description in conjunction with the accompanying drawings.

DETAILED DESCRIPTION

Figure 1:
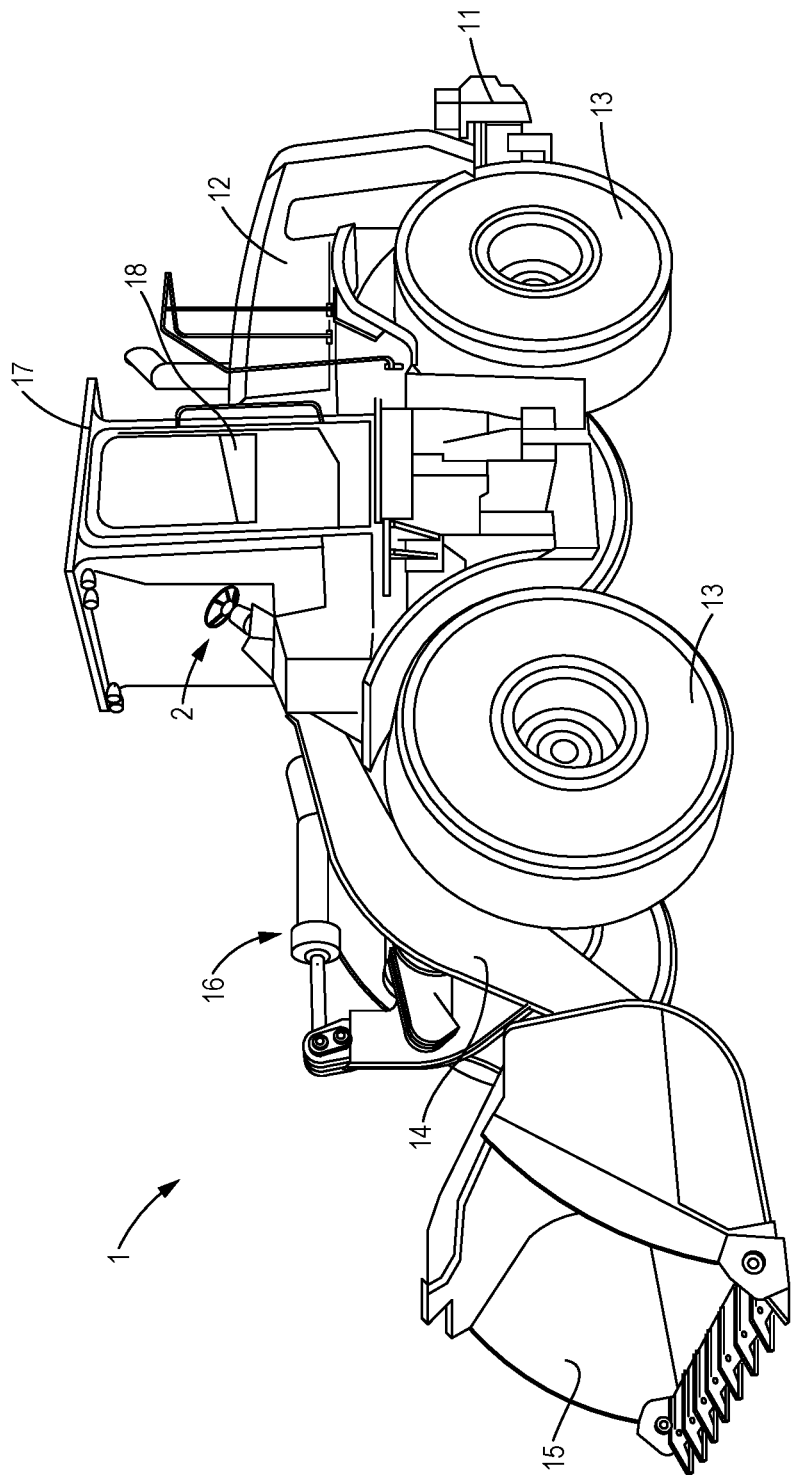
FIG. 1 is a perspective view of a work machine according to one embodiment of the present disclosure.

Referring now to the drawings and with specific reference to FIG. 1, a perspective view of a work machine constructed in accordance with the present disclosure is generally referred to by a reference numeral 1. The work machine 1 is depicted as a wheel loader, but may alternatively be any work machine designed for construction, mining, agricultural, or earth moving applications, such as but not limited to a track loader, compactor, skid steer, excavator, backhoe, and the like. The work machine 1 includes a work machine body 11, an engine or power unit 12 supported by the work machine body 11, and a locomotive device 13 supporting the work machine body 11 and being operatively driven by the power unit 12. The locomotive device 13 may feature the wheels and tires as shown, or may engage the ground in another fashion, such as by employing crawler belts, tracks, treads, or the like, in order to move the work machine 1.

The work machine 1 may include an implement arm 14 attached to the work machine body 11 at a proximate end and attached to an implement or work tool 15 at a distal end. In an embodiment where the work machine 1 is a wheel loader, the implement arm 14 may be a boom and the tool 15 may be a bucket. However, in other embodiments, the implement arm 14 may alternatively be a frame, carriage, stick, dipper, or combination thereof, and the tool 15 may be a compactor, cold planer, flail mower, mulcher, blade, etc., where no limitation is placed on the form of tool 15 nor its manner of attachment. To maneuver the tool(s) 15, the implement arm 14 and tool 15 may be actuated by a hydraulic power system 16 operatively driven by the power unit 12, for example, through a hydraulic pump and a plurality of hydraulic cylinders.

Typically, the work machine 1 is controlled by a human operator from inside an operator cabin 17 supported atop the work machine body 11. From the cabin 17, the operator may drive the work machine 1, i.e. control the locomotive device 13. The operator may further control the implement arm 14 and tool 15, and/or additional functions of the work machine 1, such as the power unit 12, the hydraulic power system 16, etc. To this end, the cabin 17 houses an implement control console 2 featuring a plurality of control inputs directed at some or all of the above actions. In some embodiments, the control console 2 may be installed on an operator seat 18 that is located inside the cabin 17.

Figure 2:
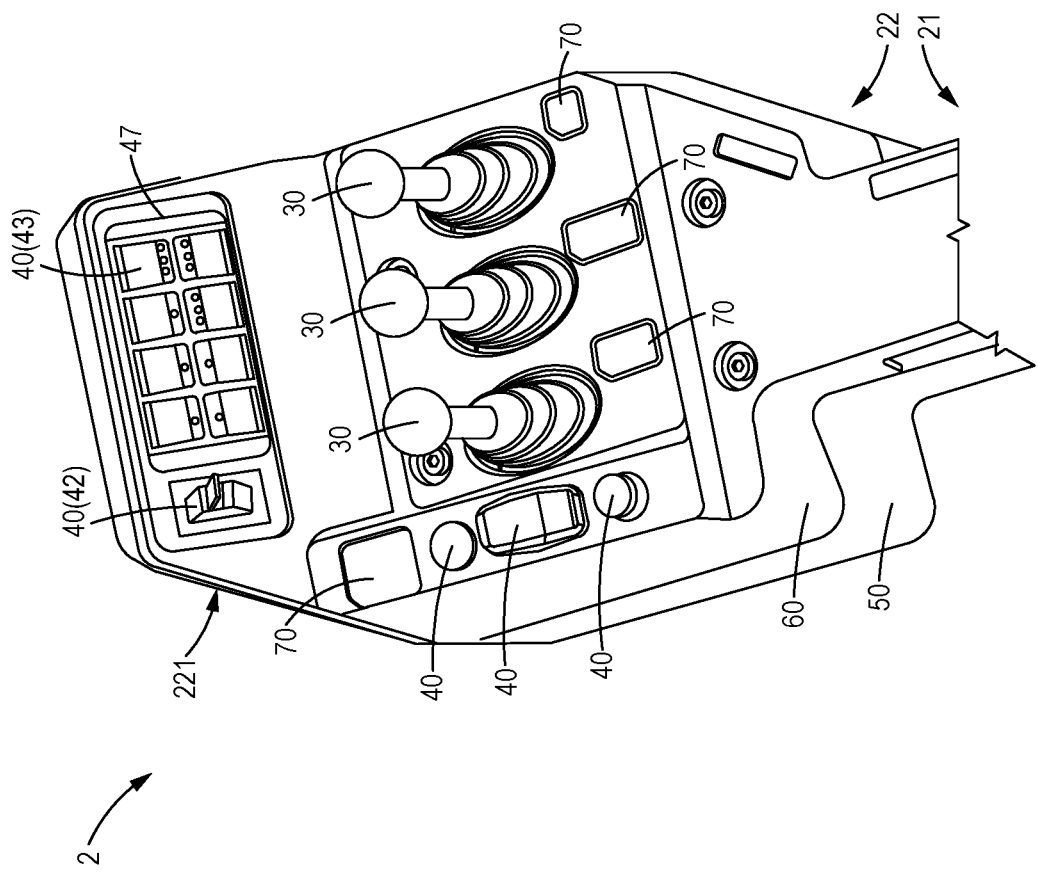
FIG. 2 is a perspective view of an implement control console according to another embodiment of the present disclosure.

Turning now to FIG. 2, a perspective view of the implement control console 2 is shown in greater detail. The control console 2 includes a universal mounting bracket 21 permanently attached to the operator seat 18 and supporting an interchangeable implement control pod 22. The implement control pod 22 is a modular attachment, wherein a plurality of unique implement control pods 22 may be installed, one at a time, to the same universal mounting bracket 21. Each implement control pod 22 includes a primary control input 30, which may be a plurality of single-axis-levers (SALs), a joystick, a control stick, or the like, where the plurality of SALs are shown by way of example in FIG. 2. Each implement control pod 22 further includes at least one secondary control input 40, which may be a keypad, a switch, a button, a toggle, or the like, each of the above also being shown by way of example in FIG. 2. Notably, each secondary control input 40 is placed and oriented in a manner enabling concurrent one-handed operation with the primary control input 30. In other words, an operator may comfortably and accurately interact with any one of the secondary control inputs 40 using a single hand without letting go of the primary control input 30. It should be understood that, while a right-handed configuration is disclosed and depicted in the figures, a left-handed configuration is similarly possible and envisioned, where the description and associated figures need only be mirrored. In some embodiments, the implement control console 2 may further comprise a universal bottom cover 50, that is a bottom component shared by some of the plurality of implement control pods 22; and a top cover 60, that is a top component unique to some of the plurality of implement control pod 22.

Figure 3:
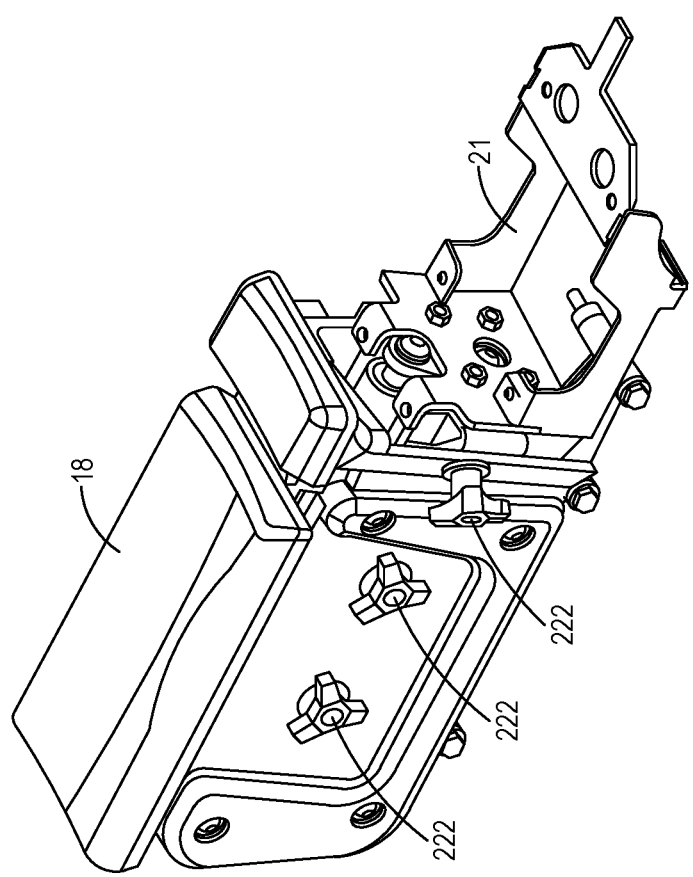
FIG. 3 is a perspective view of a universal mounting bracket according to another embodiment of the present disclosure.

Each of the plurality of implement control pods 22 may be installed onto the universal mounting bracket 21, which is depicted in FIG. 3 prior to pod 22 attachment. The universal mounting bracket 21 may be installed on the operator seat 18, and may be installed on a right armrest of the operator seat 18, such that the universal mounting bracket 21 moves together with the seat 18 if and when the seat 18 is adjusted. The universal mounting bracket 21, and by extension the control console 2, may further include their own ergonomic adjustment knobs 222, for example to alter a position, height, or angle of the control console 2 with respect to the seated operator. The universal mounting bracket 21 forms the foundation of the control console 2 and facilitates convenient installation or removal of different implement control pods 22, as discussed below.

A plurality of unique implement control pods 22 may be installed, one at a time, onto the control console 2 via the universal mounting bracket 21. In this manner, the primary control inputs 30, the secondary control inputs 40, and their arrangement may be varied according to the particular model of work machine 1, the stage of production of that work machine 1, and/or the preferences of the customer, among other possible factors. For example, during a shipping or storage stage, the work machine 1 may have installed a shipping pod 23 including a bare minimum of control inputs necessary for the transport of the work machine 1 only. During a quality testing stage, the work machine 1 may have installed a utility pod 24 including a myriad of control inputs for evaluating each and every possible function of the work machine 1. And during a commercial stage, the work machine 1 may have installed a joystick pod 25 or a SAL pod 26, each including some, but not necessarily all, of the control inputs supported on the utility pod 24, the included functions being chosen according to that work machine's 1 use case.

Figure 4:
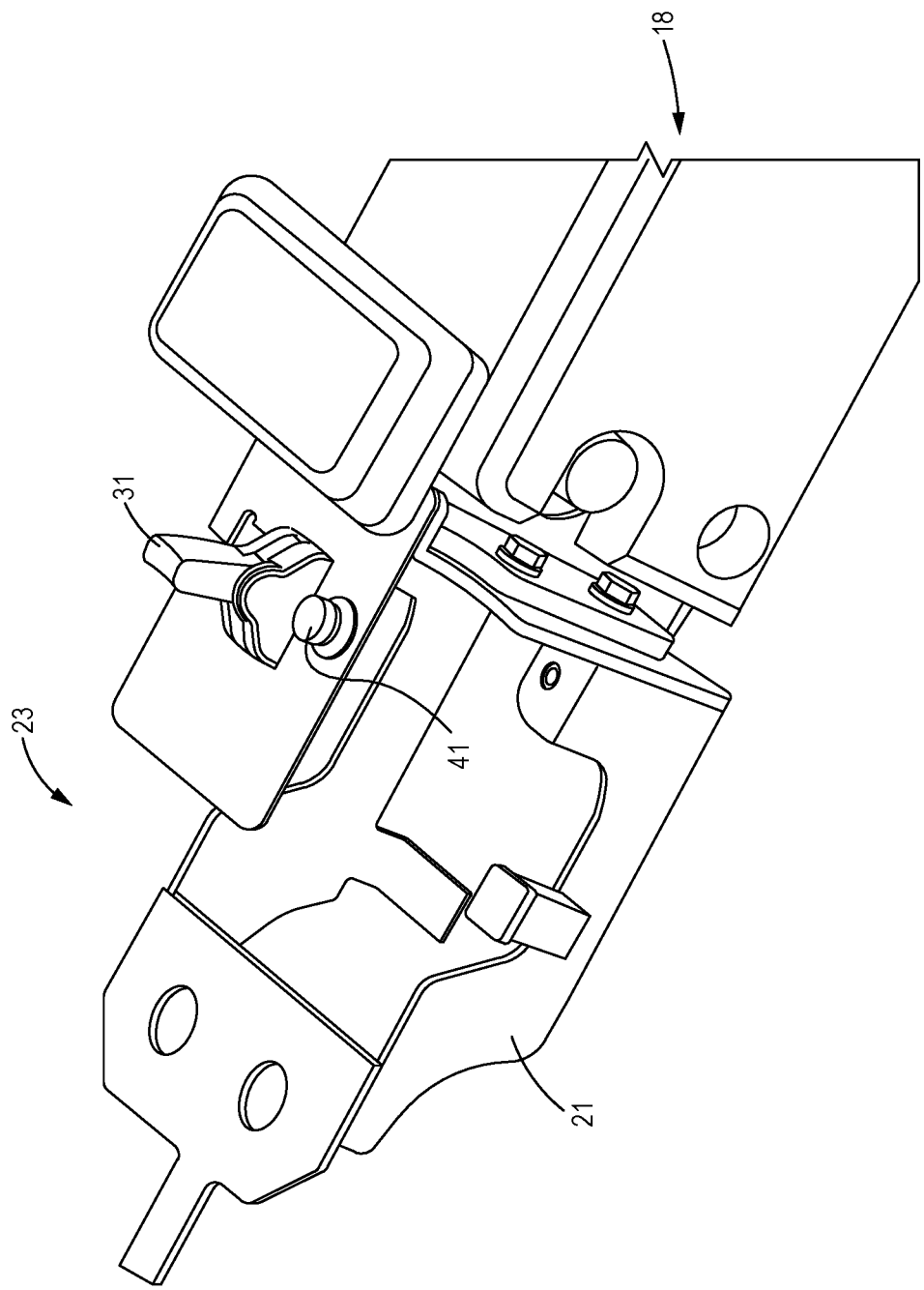
FIG. 4 is a perspective view of an implement control console including a shipping pod, according to another embodiment of the present disclosure.

Turning now to FIG. 4, an embodiment of the control console 2 is shown in detail wherein the implement control pod 22 is a shipping pod 23. The shipping pod 23 may be installed onto the universal mounting bracket 21 using a single bracket and bolt, where little to no additional fastening or housing infrastructure is needed. Notably, the shipping pod 23 does not require the universal bottom cover 50 or the top cover 60, although they may be nonetheless be included in some embodiments. The primary control input 30 for the shipping pod 23 is a control stick 31 and the secondary control input 40 consists of a button 41. In one embodiment, the control stick 31 is a boom control stick, responsible only for the lifting action of the boom 14; and the button 41 is a horn button, responsible only for an action of a horn of the work machine 1. In another embodiment of the shipping pod 23, the primary control input 30 may instead be two control sticks 31, the first being responsible for a lifting action of the boom 14 and the second being responsible for a tilting action of the tool 15; and the secondary control input 40 may consist of the same horn button 41. In either case, the shipping pod 23 is designed to provide at or near the bare minimum functionality for transport and storage of the work machine 1 only. For example, the degree of accuracy granted by the control stick(s) 31 may be coarser than that provided by the primary control inputs 30 of other control pods 22 and/or its construction may be rated for lower duty performance. In some contexts, the shipping pod 23 may be considered only a placeholder pod prior to complete assembly and commercial deployment of the work machine 1.

Figure 5:
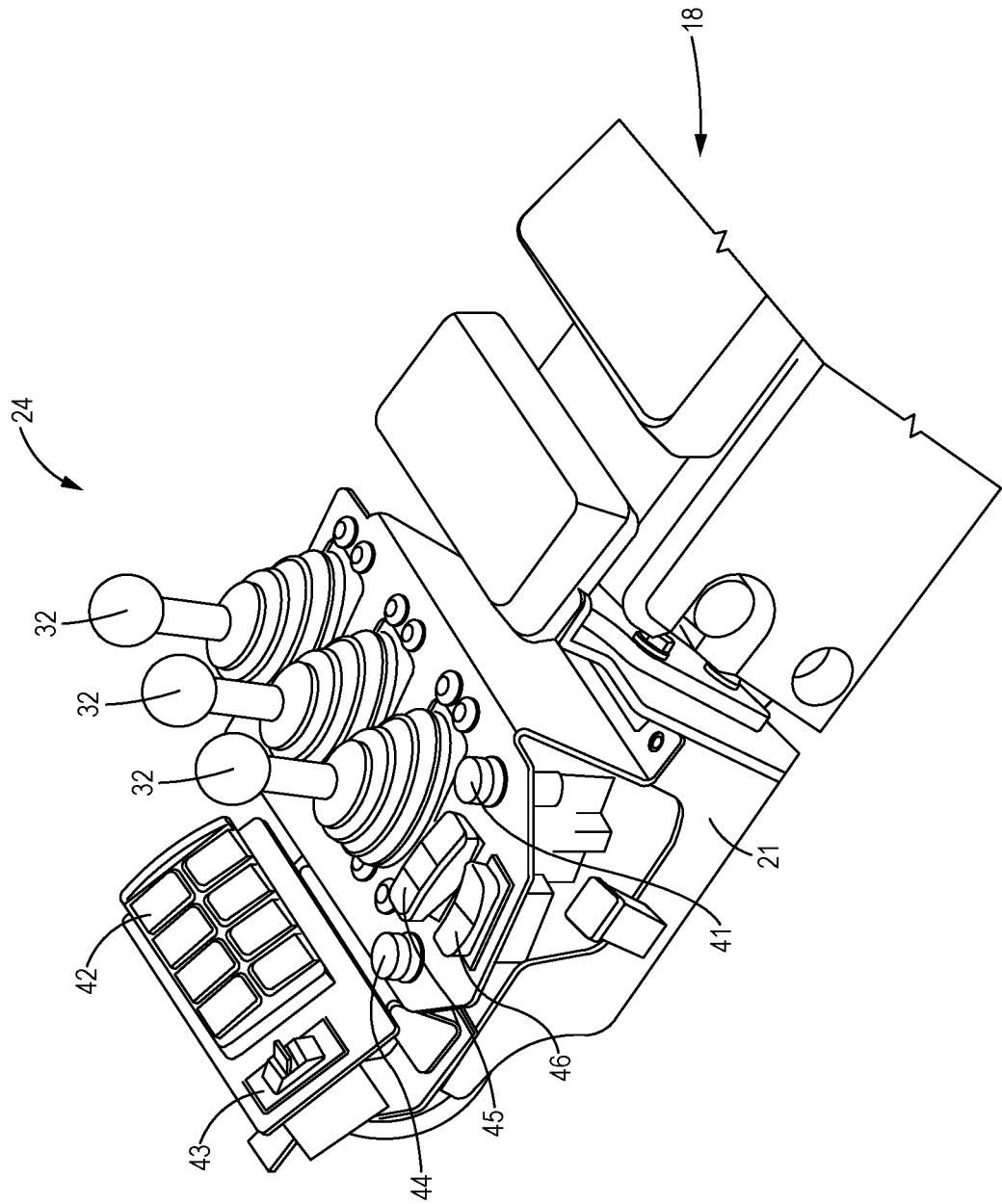
FIG. 5 is a perspective view of an implement control pod including a utility pod, according to another embodiment of the present disclosure.

Next, FIG. 5 shows an embodiment of the implement control console 2 wherein the implement control pod 22 is a utility pod 24. The utility pod 24 may be installed onto the universal mounting bracket 21 using any type or number of fasteners, where no limitation is intended by the present disclosure. Notably, the shipping pod 23 does not require the universal bottom cover 50 or the top cover 60, although they may be nonetheless be included in some embodiments. In direct contrast to the shipping pod 23, the utility pod 24 is designed to provide the full suite of control inputs for operating the work machine 1 during the production and testing stages of its life cycle. Accordingly, the primary control input 30 for the utility pod 24 may include any primary control input 30 available to the plurality of implement control pods 22, such as a joystick, a control stick, a plurality of SALs, or the like. Likewise, the utility pod 24 may include any and all secondary control inputs 40 available to the plurality of implement control pods 22, such as keypads, switches, buttons, toggles, and the like. In the exemplary embodiment shown in FIG. 5, and where the work machine 1 is a wheel loader, the primary control input 30 of the utility pod 24 may constitute the plurality of SALs 32, the first SAL 32 being responsible for a lifting action of the boom 14, the second SAL 32 being responsible for a tilting action of the tool 15, and the third SAL 32 being a programmable function. Meanwhile, the secondary control inputs 40 may include a programmable keypad 42; a programmable switch 43; a differential locking button 44, responsible for coupling the rotation of opposite wheels of the locomotive device 13; a forward-neutral-reverse toggle 45, responsible for switching a direction of travel for the locomotive device 13; a throttle lock toggle 46, responsible for maintaining or releasing an engine speed of the power unit 12; a horn button 41; and yet other items. It is worth noting that the utility pod 24 may feature redundant control inputs, i.e. inputs which perform the same or similar functions which would not be concurrently installed in a work machine 1 during commercial applications. As stated, a primary purpose of the utility pod 24 is to test the various features and inputs available to the plurality of unique implement control pods 22, thus no limitation is intended for the type or number of control inputs 30, 40 featured.

Prior to discussion of the commercial embodiments of the implement control pod 22, it is again highlighted that the plurality of unique implement control pods 22 share a number of common components. The universal mounting bracket 21 is shared across all control pods 22, the universal bottom cover 50 is shared at least across all commercial variants of implement control pods 22, as discussed below, and various primary control inputs 30 and secondary control inputs 40 may overlap across some pods 22 but be missing from others.

With regards to modularity, of particular note is the programmable keypad 42 and the programmable switch 43. As best seen in FIG. 5, the programmable keypad 42 may include a plurality of buttons each directed to a specific function of the work machine 1. For example, a first button may control a feature of the power unit 12, a second button may execute a preset motion of the implement arm 14, a third button may adjust a cabin 17 climate, and so on. Similar to the programmable keypad 42, the programmable switch 43 can be responsible for any of a number of preset commands, depending only on specific applicational requirements. While the keypad 42 is depicted with 8 buttons, a different number of buttons or arrangement thereof is also possible.

In some embodiments, such as the case with the utility pod 24 shown in FIG. 5, the programmable keypad 42 and the programmable switch 43 may be directly installed onto the implement control pod 22 without intermediate infrastructure. In other embodiments, as seen in FIG. 2, the keypad 42 and/or the switch 43 may be first installed atop a universal plate 47, which is subsequently fitted on the top cover 60 of the implement control pod 22. Advantageously, the same universal plate 47 may be shared between different implement control pods 22, thereby increasing component compatibility and reducing the number of control layouts an operator may need to learn. Furthermore, the universal plate 47 is customizable, such that it may have installed only the keypad 42, only the switch 43, both the keypad 42 and the switch 43, or neither the keypad 42 nor the switch 43. Moreover, the position of the keypad 42 and the switch 43 on the plate 47 may be adjusted or even reversed, depending on the particular pod 22. In this manner, the modularity and customizability of the control console 2 is further improved.

Figure 6:
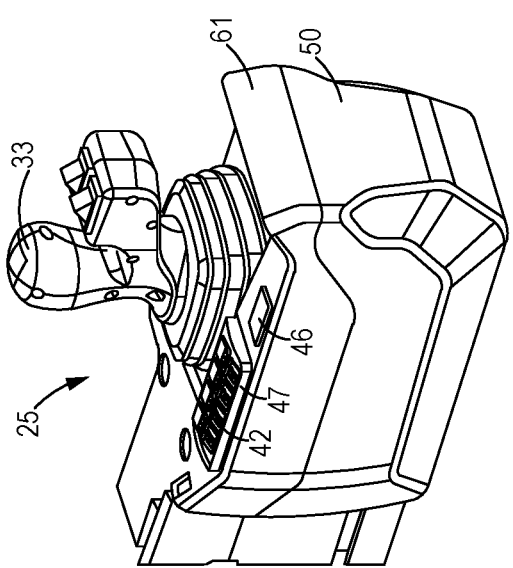
FIG. 6 is a perspective view of an implement control console including a joystick pod, according to another embodiment of the present disclosure.
Figure 8:
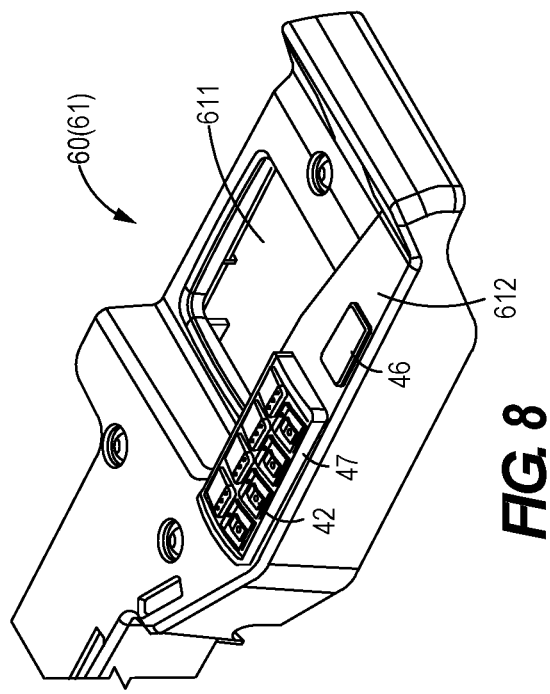
FIG. 8 is a perspective view of a component of the joystick pod seen in FIG. 6, and specifically a joystick cover.
Figure 7:
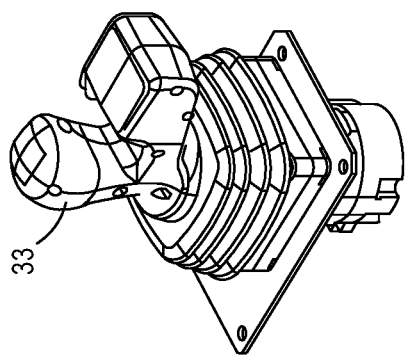
FIG. 7 is a perspective view of a component of the joystick pod seen in FIG. 6, and specifically a joystick.
Figure 11:
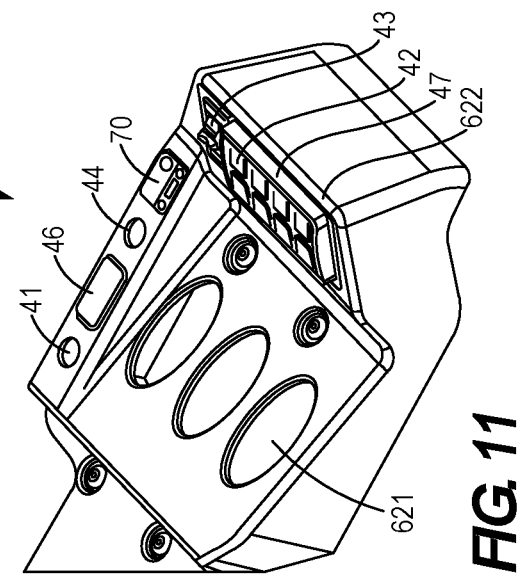
FIG. 11 is a perspective view of a component of the SAL pod seen in FIG. 9, and specifically a SAL cover.
Figure 9:
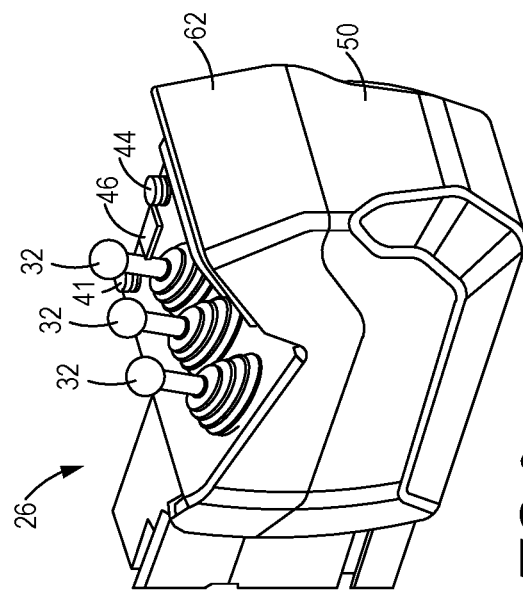
FIG. 9 is a perspective view of an implement control console including a single-axis-lever (SAL) pod, according to another embodiment of the present disclosure.
Figure 10:
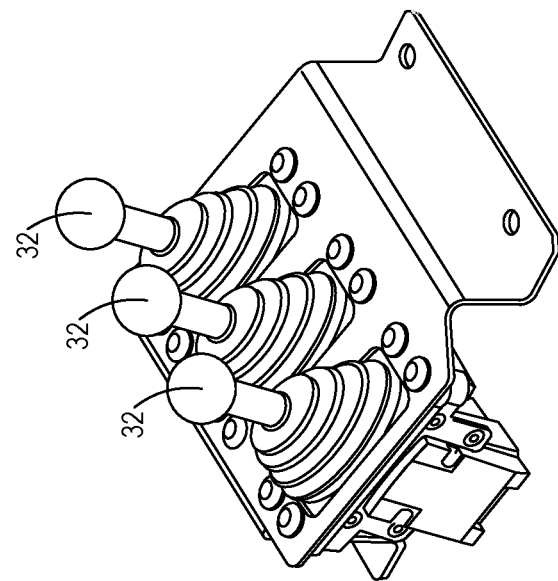
FIG. 10 is a perspective view of a component of the SAL pod seen in FIG. 9, and specifically a plurality of SALs.

Turning now to FIGS. 6-11, two commercial variants of the implement control pods 22, or those commonly deployed during everyday use of the work machine 1, are depicted. The first is a joystick pod 25 as shown in FIGS. 6-8, and the second is a SAL pod 26 as shown in FIGS. 9-11. Both the joystick pod 25 and the SAL pod 26 may be mounted to the universal mounting bracket 21, share the universal bottom cover 50, and include a unique top cover 60. For the joystick pod 25, the primary control input 30 is a joystick 33 and the top cover 60 is a joystick cover 61. For the SAL pod 26, the primary control input 30 is the plurality of SALs 32 and the top cover 60 is a SAL cover 62. It should be understood that the universal bottom cover 50 is designed to be shared by both the joystick pod 25 and the SAL pod 26, and may also be fitted onto other embodiments of pods 22. In contrast, the top cover 60 is designed to mate with its specific pod 22 only, as it is limited by the geometry of the primary control input 30 and the combination of secondary control inputs 40 provided. Regardless, both the bottom cover 50 and the top cover 60 may engage with the universal mounting bracket 21 and/or with one another.

FIG. 6 shows a perspective view of the joystick pod 25; FIG. 7 shows the joystick 33; and FIG. 8 shows the corresponding top cover 60 for the joystick pod 25, a joystick cover 61. It can be seen that, after installation, the joystick 33 protrudes from a joystick aperture 611 of the joystick cover 61. In an embodiment where the work machine 1 is a wheel loader, a first axis of motion of the joystick 33 may control a lifting action of the boom 14 while a second axis of motion of the joystick 33 may control a tilting action of the tool 15. In addition, the joystick 33 may feature a number of ergonomic features, including a palm-fit curvature, a thumb rest, an oblate top, and a central grip, the details of which will not be discussed further in the present disclosure. A number of secondary control inputs 40 are provided on a right-segment 612 of the joystick cover 61, such that each secondary control input 40 is capable of concurrent one-handed operation with the joystick 33. In the embodiment shown, the joystick pod 25 includes the programmable keypad 42 and the throttle lock toggle 46. Furthermore, the keypad 42 is first installed on the universal plate 47, in this case without the programmable switch 43, and the universal plate 47 subsequently fixed to the joystick cover 61. However, in other embodiments of the joystick pod 25, the universal plate 47 may further include the programmable switch 43, and/or the joystick cover 61 may include additional secondary control inputs 40 not seen in FIGS. 6-8.

FIG. 9 is a perspective view of a SAL pod 26; FIG. 10 shows a plurality of SALs 32; and FIG. 11 shows the corresponding top cover 60 for the SAL pod 26, a SAL cover 62. It can be seen that, after installation, the plurality of SALs 32 protrude from respective SAL apertures 621 of the SAL cover 62. Where the work machine 1 is a wheel loader, a first SAL 32 may control a lifting action of the boom 14, a second SAL 32 may control a tilting action of the tool 15, and a third SAL 32 may be programmable. In other embodiments, the SAL pod 26 may only include two SALs 32 as the primary control input 30, each controlling the boom 14 and tool 15, respectively. It should be understood that, in such a case, the SAL cover 62 would be shaped differently to integrate with the SALs 32, e.g. by having two SAL apertures 621 instead of three. A number of secondary control inputs 40 are provided on a top-segment 622 of the SAL cover 62, such that each secondary control input 40 is capable of concurrent one-handed operation with the plurality of SALs 32. In the embodiment shown, the SAL pod 26 includes the programmable keypad 42, the programmable switch 43, the differential locking button 44, the throttle lock toggle 46, and the horn button 41. Notably, the keypad 42 and the switch 43 are first installed on the universal plate 47, and the universal plate 47 subsequently fixed to the SAL cover 62. In some embodiments, the universal plate 47 may be angled between 30 and 50 degrees, and preferably 40 degrees, to a horizontal plane, an orientation found to best enable concurrent one-handed operation. And in other embodiments, the universal plate 47 may only include the keypad 42, may only include the switch 43, or may include both but reverse their relative placements.

With continued reference to FIG. 11, it can be seen that the SAL cover 62 includes at least one state indicator 70. However, a better understanding may be obtained with reference to the implement control pod 22 seen in FIG. 2. Each state indicator 70 may correspond to the function, present state, or other property of a respective primary control input 30 or secondary control input 40. For example, in FIG. 2, the state indicator 70 below the first lever and corresponding thereto may light up when that lever is activated and further indicate a direction of actuation. Likewise, the state indicator 70 for the second lever may do the same. Each state indicator 70 may be uniquely dimensioned and have a chamfered top-left corner, so as to remove any confusion between different indicators 70 during an installation process. The state indicators 70 are preferably installed onto the top cover 60 of the implement control pod 22, and may be added for any combination of the available control inputs 30, 40.

Finally, as depicted in FIG. 2, the control console 2 may have a chamfered corner 221, which may be a bottom-left-front corner in some embodiments. The chamfered corner 221 improves leg room, specifically knee clearance, for the operator sitting inside the operator seat 18. The geometry of the chamfered corner 221 may be chamfered from a bottom-view projection, from a left-view projection, from a front-view projection, or combination thereof, so long as the shape of the control console 2 does not interfere with the operator's leg during use.

While the present disclosure has discussed the shipping pod 23, the utility pod 24, the joystick pod 25, and the SAL pod 26 in detail, it should be understood that any number of implement control pods 22 may be designed and fitted with the universal mounting bracket 21 to form the implement control console 2. Each implement control pod 22 need only be compatible with the universal mounting bracket 21, include a primary control input 30, and at least one secondary control input 40, each secondary control input 40 being capable of concurrent one-handed operation with the primary control input 30. The various control inputs 30, 40 disclosed herein may be rearranged or included in different combinations and additional, unspecified inputs 30, 40 may be included without departing from the purview of the present disclosure. These control inputs 30, 40 and their arrangement may be decided according to specific applicational requirements with respect to the particular work machine 1 configuration, its production cycle, and customer preferences, among other factors. Regardless of the motivation, the disclosed framework enables a modular implement control pod 22 capable of being easily customized, installed, replaced, exchanged, and repaired, while furthering the comfort and ease of use of the operator.

INDUSTRIAL APPLICATION

In operation, the present application may find industrial applicability in any number of work machines being piloted by an operator through an implement control console. It may apply particularly towards those work machines having varied control consoles across different models, styles, and configurations. While the work machine is depicted as a wheel loader, the present disclosure likewise applies to other work machines used in earth moving, construction, mining, and agricultural fields, including but not limited to track loaders, compactors, excavators, backhoes, skid steers, and the like. By employing the designs disclosed herein, control consoles may exhibit greater modularity while improving the comfort, accuracy, and ease of use for the operator.

For example, a wheel loader may incorporate a particular locomotive device, implement arm, or work tool. It may also provide or utilize a specific gross power output, hydraulic operating pressure, weight capacity, and so on. The function set and operating parameters of the wheel loader are thus reflected in the features of the implement control console. Consequently, the modular control pods disclosed herein provide a means for efficiently producing and installing suitable control consoles with their corresponding machines. The increased part compatibility between control consoles enables manufacturers to increase the scale of production and to reduce inventory. Meanwhile, specific embodiments of the control pod, such as the utility pod and the shipping pod, can streamline testing and facilitate aftermarket customization, respectively.

According to another objective of the disclosure, the design of each implement control pod improves the comfort, accuracy, and ease of use for the operator. The placement and orientation of each secondary control input with respect to the primary control input enables concurrent one-handed operation. Furthermore, shared parts, such as the universal plate, allow an operator switching between machines (and between control consoles) to reduce the mental effort associated with relearning controls. Finally, the chamfered bottom-left-front corner of the implement control console frees leg room and enhances the comfort offered by the operator seat.

While a wheel loader has been shown by way of example, other work machines nonetheless share the property of requiring operator input through a control console. Hence, the modularity disclosed by the present disclosure will apply to any work machine benefitting from customizable control consoles. In addition, the ergonomic one-handed design of each implement control pod may apply to those work machines requiring multitasking, for example in those machines where an operator must both drive the machine and control its tools.

Figure 12:
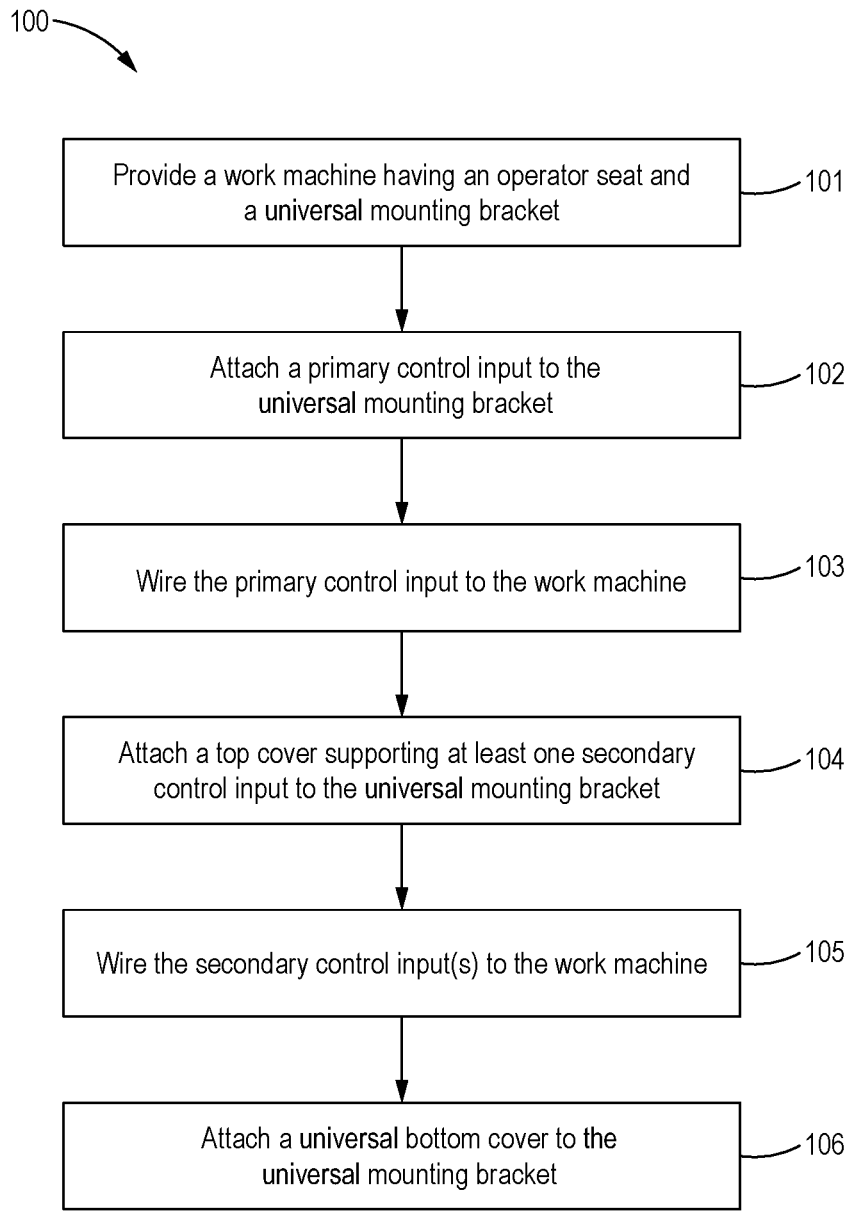
FIG. 12 is a flowchart depicting a sample sequence of steps which may be enacted in accordance with a method of the present disclosure.

Turning now to FIG. 12, a method of installing an implement control pod onto a work machine is generally referred to by a reference numeral 100. The method comprises first providing a work machine having an operator seat and a universal mounting bracket (block 101). The universal mounting bracket may be fixedly attached to the operator seat and accompany any adjustments made to the operator seat. Alternatively, the universal mounting bracket may have its own ergonomic adjustment knobs, for example to alter a position, height, or tilt with respect to the operator seat. Next, a primary control input is attached to the universal mounting bracket (block 102). This may be accomplished using any type or number of fasteners commonly known in the art, such as but not limited to screws, bolts, rivets, latches, clips, force fits, etc. The attachment mechanism may be reversible, although permanent means, such as welding, crimping, gluing, and the like, are also possible and envisioned. The primary control input is then wired to the work machine (block 103), such that any mechanical, analog electrical, digital electrical, or other signals may be sent from the primary control input to, for example, an onboard computer of the work machine. The signals sent from the primary control input may operatively actuate the implements of the work machine, for example through the hydraulic power system and a plurality of hydraulic cylinders. Where the primary control input includes feedback mechanisms, the wiring step may enable signals to be sent from the work machine to the primary control input as well. In block 104, a top cover supporting at least one secondary control input is attached to the universal mounting bracket. As shown in FIGS. 6-11, the primary control input may be positioned through an aperture of the top cover during and after installation. The top cover may be fastened using any type or number of fasteners commonly known in the art, and may be further fastened to the primary control input. Next, the at least one secondary control input is wired to the work machine, for example to an onboard computer of the work machine (block 105). Once all of the connections have been wired, a universal bottom cover is attached to the universal mounting bracket (block 106). The universal bottom cover may optionally be attached to the top cover and/or to the primary control input, and may be installed using any type or number of fasteners commonly known in the art. In this manner, an implement control pod, and potentially a commercial variant of the implement control pod, can be installed onto a work machine.

It is worth mentioning that a negation and reversal of the foregoing steps may be applied to uninstall the same implement control pod, especially where the fastening mechanism is reversible. Furthermore, in some embodiments, the work machine may come preinstalled with a shipping pod, which may need replacement prior to commercial use. In such cases, the above method may be preceded by an initial step for removing the shipping pod. This may be accomplished by first disconnecting the wiring between the primary control inputs and the work machine and between the secondary control inputs and the work machine. Next, the fasteners, which may be a single bracket and bolt, are removed. Thus, the universal mounting bracket is readily available for installation of any other implement control pod.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. An implement control console, comprising:
   a universal mounting bracket;
   a universal bottom cover;
   a top cover;
   a universal plate installed on the top cover; and
   an implement control pod installed on the universal mounting bracket, the implement control pod including a primary control input and at least one secondary control input, each secondary control input being capable of concurrent one-handed operation with the primary control input, wherein the at least one secondary control input includes a programmable keypad and/or a programmable switch, either or both being installed on the universal plate, and wherein the universal plate is angled between 30 and 50 degrees to a horizontal plane.

2. The implement control console according to claim 1, wherein a plurality of unique implement control pods may be installed, one at a time, to the universal mounting bracket.

3. The implement control console according to claim 1, wherein the implement control pod is a shipping pod, the primary control input is a control stick, and the at least one secondary control input consists of a button.

4. The implement control console according to claim 2, wherein the plurality of unique implement control pods include a utility pod and the at least one secondary control input comprises all secondary control inputs available to the plurality of unique implement control pods.

5. The implement control console according to claim 1, wherein the implement control pod is a joystick pod, the top cover is a joystick cover, and the primary control input is a joystick.

6. The implement control console according to claim 1, wherein the implement control pod is a single-axis-lever (SAL) pod, the top cover is a SAL cover, and the primary control input is a plurality of SALs.

7. The implement control console according to claim 1, wherein the implement control console has a chamfered corner.

8. An implement control console, comprising:
a universal mounting bracket;
a universal bottom cover;
a top cover;
a universal plate installed on the top cover; and
an implement control pod installed on the universal mounting bracket, the implement control pod including a primary control input and at least one secondary control input, each secondary control input being capable of concurrent one-handed operation with the primary control input, wherein the implement control pod is a joystick pod, the top cover is a joystick cover, and the primary control input is a joystick.

9. The implement control console according to claim 8, wherein a plurality of unique implement control pods may be installed, one at a time, to the universal mounting bracket.

10. The implement control console according to claim 8, wherein the at least one secondary control input includes a programmable keypad and/or a programmable switch, either or both being installed on the universal plate.

11. The implement control console according to claim 10, wherein the universal plate is angled between 30 and 50 degrees to a horizontal plane.

12. The implement control console according to claim 8, wherein the implement control console has a chamfered corner.

* * * * *